July 26, 1960 — G. O. CONNER — 2,946,583
WORK AND TOOL HOLDERS FOR METAL WORKING MACHINES
Original Filed March 12, 1951 — 5 Sheets-Sheet 1

INVENTOR.
GUY O. CONNER
BY W. H. Woodlief
ATTORNEY

July 26, 1960   G. O. CONNER   2,946,583
WORK AND TOOL HOLDERS FOR METAL WORKING MACHINES
Original Filed March 12, 1951   5 Sheets-Sheet 2

INVENTOR.
GUY O. CONNER
BY W. H. Woodlief
ATTORNEY

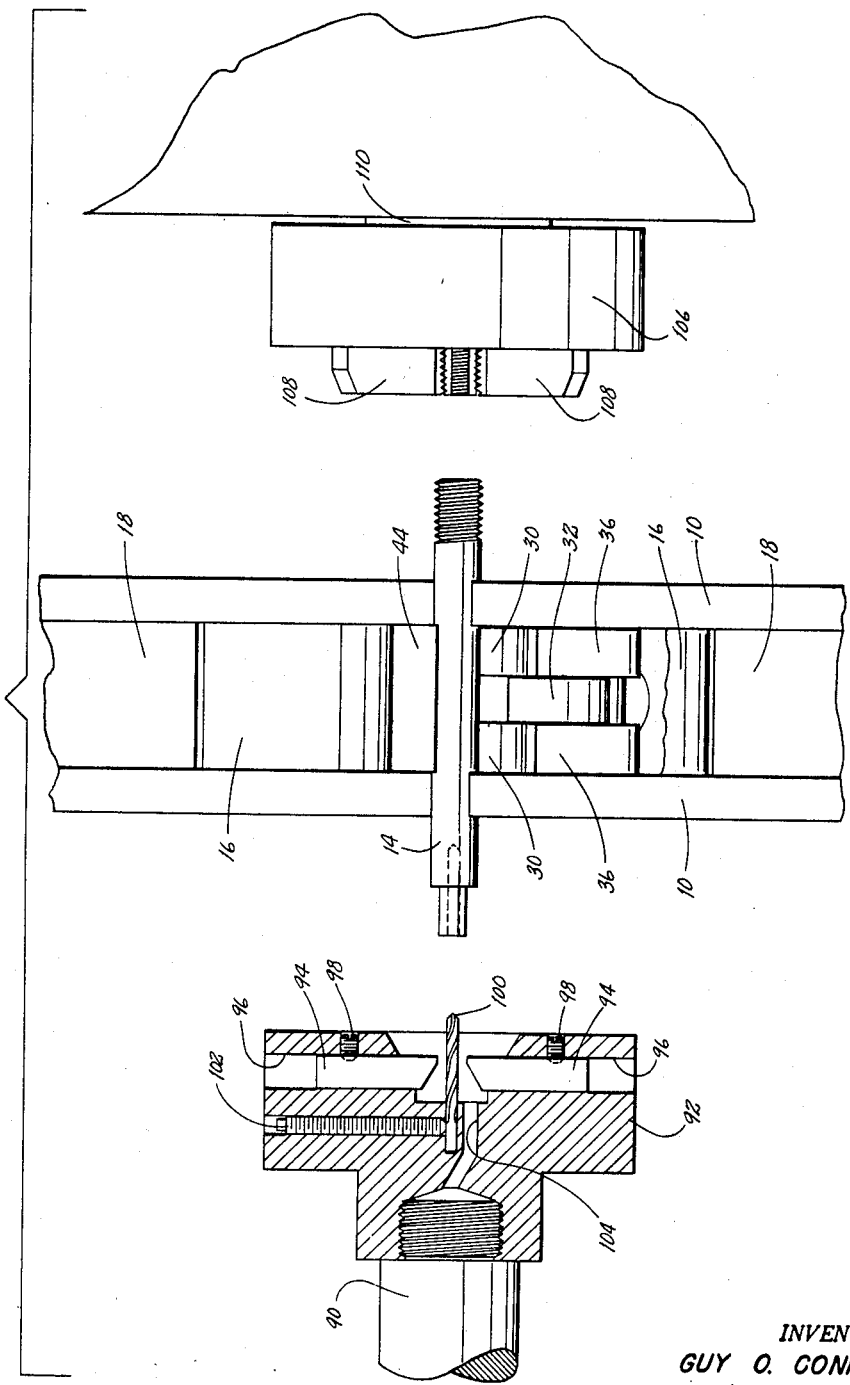

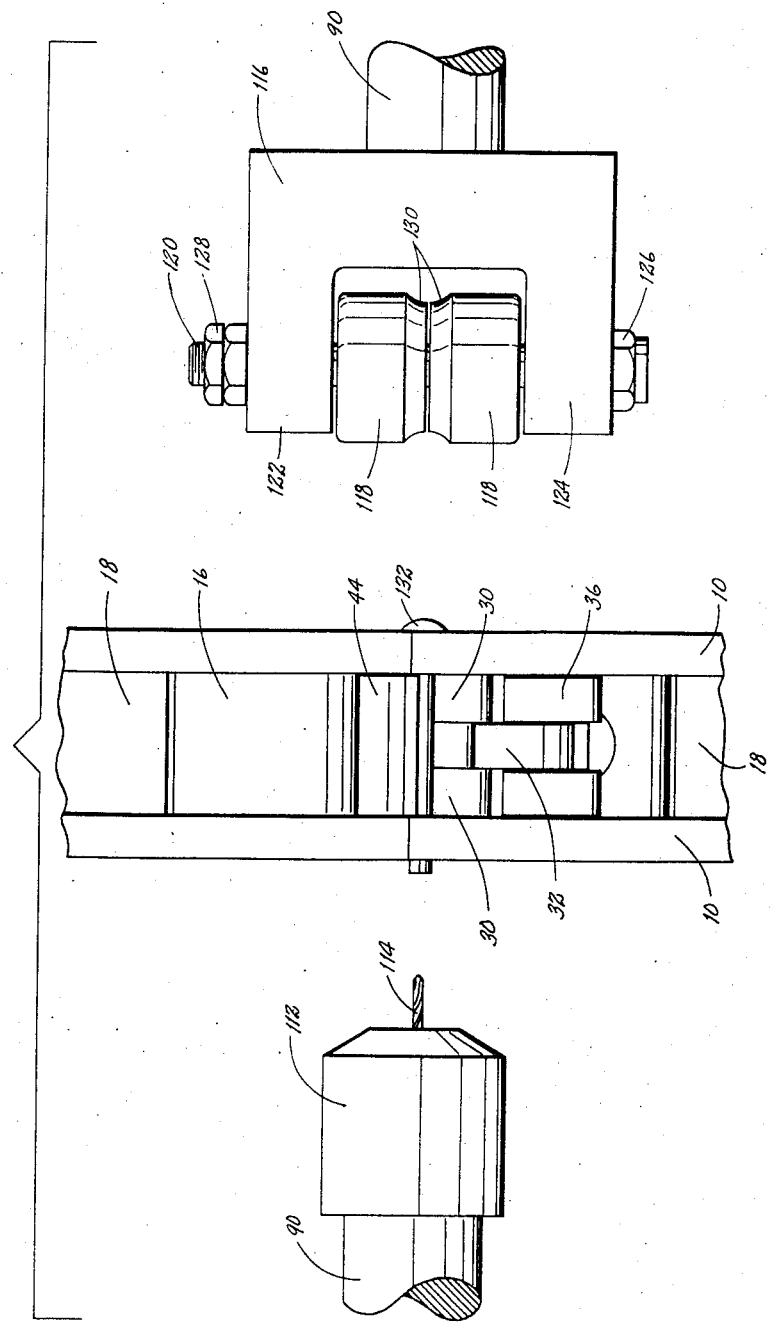

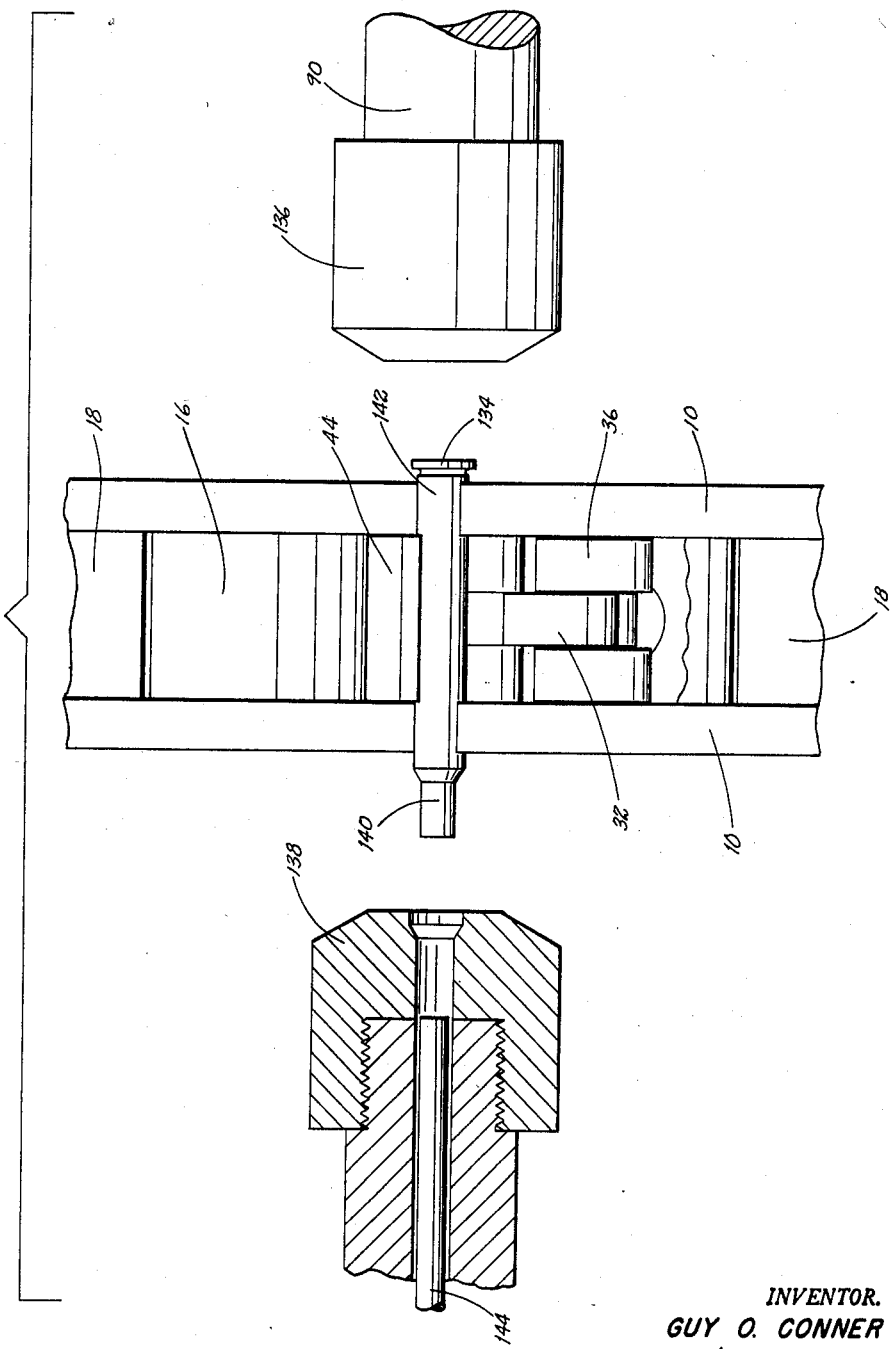

United States Patent Office 2,946,583
Patented July 26, 1960

2,946,583

WORK AND TOOL HOLDERS FOR METAL WORKING MACHINES

Guy O. Conner, Cleveland, Ohio, assignor to Republic Steel Corporation, Cleveland, Ohio, a corporation of New Jersey Original application Mar. 12, 1951, Ser. No. 215,131, now Patent No. 2,828,492, dated Apr. 1, 1958. Divided and this application Mar. 25, 1958, Ser. No. 723,698

5 Claims. (Cl. 269—155)

This invention relates to work and tool holders for metal working machines such as the machine disclosed in my United States Patent No. 2,828,492, dated April 1, 1958, for Nut Tapping Machine Having Releasable tap Holding Means to Discharge Tapped Nuts Therefrom, of which this application is a division.

More specifically, the invention relates to a work holder of the rotary type which is adapted to hold and carry a plurality of workpieces in such manner that opposite ends of the workpieces are exposed beyond the work holder in such position that forming tools may be brought into contact with opposite ends of the workpieces so held.

It is an object of this invention to provide a work holder having effective means for positively clamping workpieces to be held by the work holder while forming tools are operating on the workpieces.

It is a further object of this invention to provide a device of the kind described in which workpieces are automatically fed into sockets of a rotary work holder and, after having been operated thereon, the workpieces are automatically discharged from the work holder.

It is still a further object of this invention to provide a work holder of the class described in combination with certain tool holders for performing forming operations at opposite ends of a plurality of workpieces being supported and transported through a working cycle by the work holder.

These and other objects of the invention will be clear from a reading of the following specification in light of the drawings forming a part of the application and in which drawings like reference numerals indicate like parts, and in which:

Fig. 3 is a view partly in section of tools useful in performing operations on a workpiece held by the work holder of Fig. 1;

Fig. 4 is a view in elevation of the novel parts of an alternative tool designed for a spinning operation; and Fig. 5 is a view similar to Fig. 4 of another embodiment adapted for a die-reducing or extruding operation.

Figure 1:
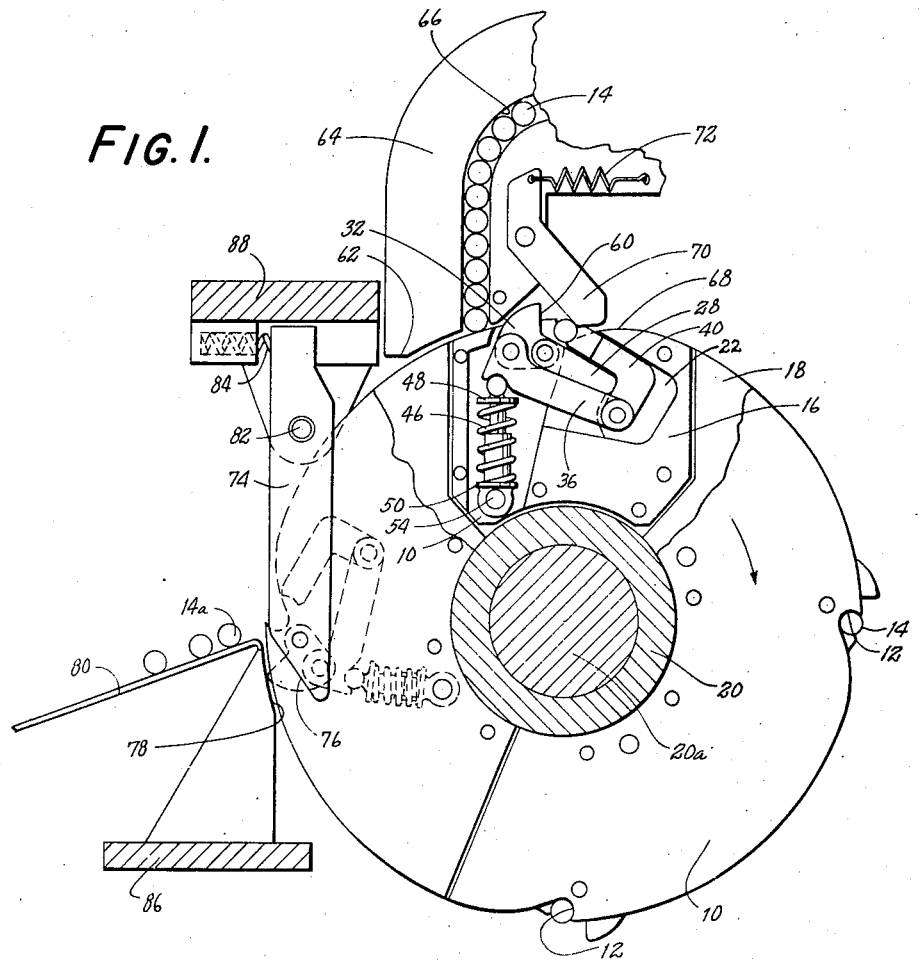
Fig. 1 is a side elevational view of work holder mechanism comprising the invention, with parts broken away to show underlying structure.

In order to perform operations on the exterior surfaces of a workpiece, the piece must extend beyond the work holder. This precludes any clamping of the workpiece at its ends as suggested in regard to the threading of nuts in my aforesaid patent. Therefore, the work holder of the present application makes provision for the clamping of workpieces such that both ends thereof protrude from the work holder to permit forming operations to be performed on the protruding ends of the workpiece being operated on.

The work holder herein is composed of three main radial components. By reference to Fig. 1, it will be seen that a pair of identical disk-shaped plates 10 are formed with a plurality of peripheral hooks 12, the number being dependent upon the number of clamps for which space is available. The workpiece 14 is carried in these hooks and is clamped in place by a toggle clamp arrangement shown closed in Fig. 1 and open in Fig. 2.

The toggle clamp may be mounted on a separate plate 16 as illustrated, in which case a series of spacers 18 are used between the plates 10. It is obvious that a series of clamps could also be mounted on a single ring split into two pieces for assembly on the hub member 20 which is the same as the hub 64 in my aforesaid patent. The plate 16 is formed to provide an irregular opening 22 defined by the lines 22a, 22b, 22c, 22d and 22e in Fig. 2. An upwardly extending thinned portion, or neck 26, is disposed midway between the sides of the plate 16 in the opening 22. The neck 26 terminates in a boss 28 (Fig. 2), extending outwardly from the neck 26 at 30. The boss 28 is bifurcated to receive a toggle member 32 which is pivoted on the pin 34. Two identical links 36 straddle the neck 26 and are pivoted to the member 32 at 38 and to a clamping member 40 at 42. The links 36 are disposed wholly within the boundaries of the opening 22. The clamping member 40 is formed with a jaw 44 extending the full distance between the plate 10. Both the jaw 44 and the hooks 12 may be knurled or otherwise treated, to assure a better grip on the workpiece. The clamping member 40 and its jaw 44 are guided by the upper surface of the boss 28 and the opposing surface of the opening 22.

Figure 2:
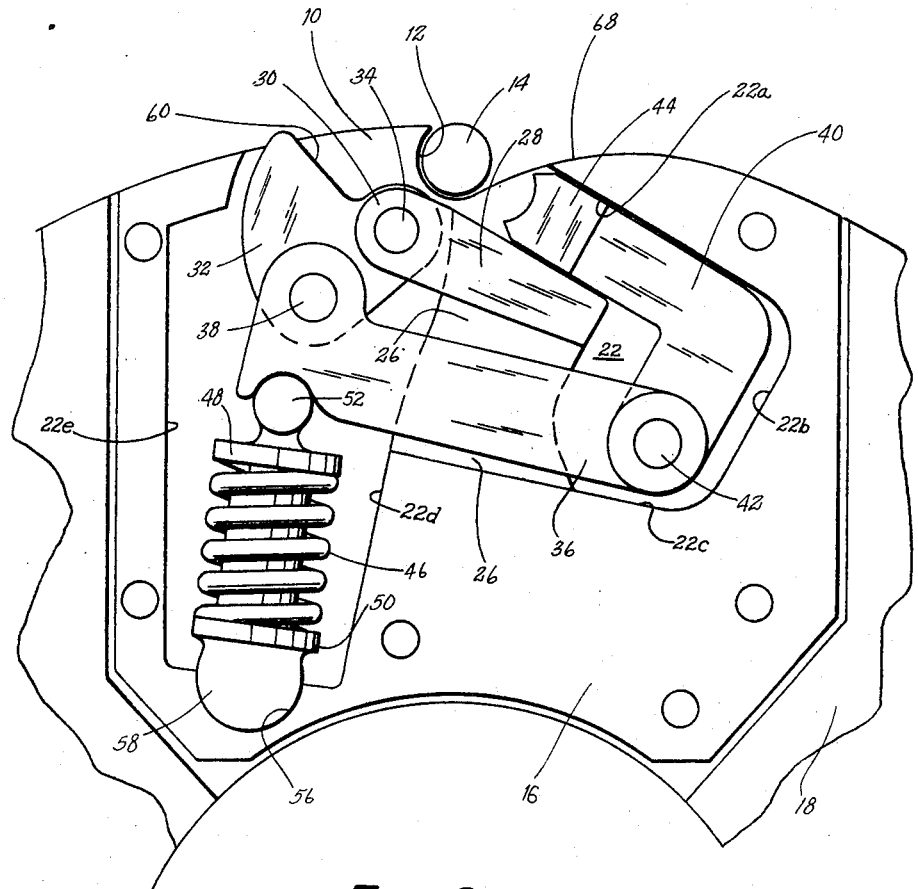
Fig. 2 is an enlarged detail view of the clamping mechanism of the work holder of Fig. 1.

The links are properly proportioned to provide a proper toggle action to close the clamping jaw 44 on the workpiece as is well known in the art. The clamping force is provided by a spring 46. This spring is preferably provided with telescoping end fittings 48 and 50 adapted to keep the spring straight and in line. The outer end fitting 48 is provided with a transverse bar 52 seating in suitable notches formed in the links 36. The other end of the fitting 50 must be fixed to the work holder member. Two possible methods of fixing the spring are illustrated. In Fig. 1, the fitting 50 is fixed between the plates 10 by a pin 54 engaged therebetween. In the embodiment of Fig. 2, the fitting 50 is provided with a transverse, parti-cylindrical bar 56 engaged in a groove 58 in the plate 16. In either embodiment it is apparent that the spring has sufficient freedom of motion for proper operation.

Means for loading and unloading this work holder are illustrated in Fig. 1. In order for a workpiece 14 to be picked up by the hooks 12, the clamp must be open. The toggle member is formed with a follower part 60 which extends beyond the periphery of the plates 10. A cam surface 62 is formed on the framework 64 of an inlet channel 66 in position to engage the follower part 60 and move it down to the position shown in Fig. 2 to open the clamp. While the clamp is thus opened, the lowest workpiece in the channel 66 slides or rolls down the sloping surfaces 68 on the plates 10 and is picked up and carried along by the hooks 12. Shortly after the piece is picked up, the cam member 60 is released and the spring 46 forces the clamp closed. Meanwhile, the workpiece is pressed against the hooks by a pair of pivoted arms 70 extending beside the outer surface of the plates 10. A spring 72 urges the arms 70 against the ends of the workpiece which extend beyond the work holder. The pieces 14 may be fed into the channel 63 by any convenient means.

The unloading means is somewhat similar in operation and construction to the loading means. A pair of arms 74 extending on both sides of the plates 10 are formed with a sloping surface 76 adapted to engage the finished piece 14a and roll or slide it out of the hooks 12. The clamp is opened by a cam surface 78 similar to that of the loading mechanism, and a ramp or slide 80 is provided to move the product pieces 14a away from the machine. In order to prevent damage to the machine or product, the arms 74 are pivoted at 82 and are loaded by a spring 84 to provide sufficient freedom of motion to prevent forcible destruction of parts. Both the ramp 80 and the arms 74 may be supported by cross members 86 and 88 fastened to either the guide members 9 or the supports 14 shown in Fig. 3 of my aforesaid application for patent.

The types of work which may be performed by my machine using this type of work holder are illustrated in Figs. 3–5. It will be recognized that the operations here described are not exclusive but are merely illustrative. As stated above, the particular work holder just described is useful for holding pieces whose ends extend beyond the edges of the plates 10. It is on these ends that the operations are performed. The heads holding the tools may be fixed on spindles 90 which may be mounted and driven in precisely the same way as taught in my aforesaid application for patent, although the precise shape of the spindle control cam might be altered to meet the requirements of the particular operation to be performed. As illustrated, the left hand head 92 is adapted to turn down the outside diameter of the fitting or workpiece 14 while, at the same time, drilling a central hole. This is accomplished by mounting a series of tool bits 94 in grooves or holes 96 in the head and clamping them in place with set screws 98 or any other device well known in the art. A drill bit 100 is set in a hole in the head 92 and may also be held by a set screw 102. A hole 104 is provided for the flow of cutting fluid from the center of the spindle out to the cutting edges of the tool bits. Since the fluid comes from the interior of the head, it is effective to flush the chips outward and away from the head to keep the head as free as possible from chips and the like.

The right hand head 106 may be any conventional type of bolt threading cutter adapted to cut the threads on a bolt and then expand the dies 108 to release the threads. This type of thread cutter is well known in the art and can be adapted for use in the machine simply by providing a boss having internal threads to match those on the spindle. A central opening may also be provided in this head similarly to that in the left hand head 92 to provide for cutting fluid flow. This embodiment is one of the embodiments where rotation of the heads on opposite sides of the workpiece could readily be in opposite directions as described in connection with the spindle drive of my aforesaid application for patent. If the rotation were in that manner, the clamping of the workpiece in the clamp would not have to be so tight since the rotative forces of the tools would oppose each other and tend to stabilize the workpiece.

Thus by this embodiment, the machine may be adapted to work on the ends of a fitting by threading, cutting, drilling, or the like. Many other similar operations will be apparent to those skilled in the art, and those described merely illustrate a few of the possibilities which may be realized by the use of my new machine.

In addition to the cutting operations described above, my machine may be readily adapted for simple pressing operations, a few of which are described below.

One embodiment useful in the formation of rivets is illustrated in Fig. 4. This embodiment utilizes the same type of work holder mechanism as does the embodiment shown in Figs. 1–3. It is obvious that the mechanism may be made as wide or as narrow as required by the particular operation or piece to be worked on. As the piece is carried by the work holder, one operation is performed at each end.

At the left hand end the spindle 90 carries a head 112 in which a drill bit 114 is firmly held. This bit is carried into cutting engagement with the end of the blank and to its proper depth by a drum cam as described in my aforesaid application for patent and, therefore, drills a hole in the end of the rivet. The depth of the hole is readily determined by the form of the drum cam.

At the right hand side, the spindle 90 carries a bifurcated head 116. A pair of rollers 118 are journalled on a shaft 120 carried between the arms 122 and 124 of the head 116. The shaft 120 may be in the form of a bolt having a head 126 at one end and held by a pair of jammed nuts 128 at the other. The rollers 118 are each formed with an annular groove 130 at one edge. These grooves, when the rollers are mounted together form a single groove parti-cylindrical in cross section. When the head 116 is rotated, the rollers 118 are free to rotate about the shaft 120 in opposite directions and when pressed against the end of the rivet blank they will roll out a head 132 thereon. Proper bearings, both for radial and thrust loads, are provided in the rollers 118 so that the rolling action is assured. Movement of the spindles is controlled in the same manner as in the prior described embodiments.

Another embodiment useful for a tube reducing operation is shown in Fig. 5. A work holding device similar to that of the embodiment of Figs. 1 and 2 may be used. However, in this embodiment it is not essential that the workpiece 14 be prevented from turning, and therefore the spring 46 of the clamp need not be so strong as for the prior described embodiments. This reduction in the clamping action may also be desirable since the workpiece 14 is tubular and therefore subject to crushing.

The particular operation shown is the reducing of the end of a cartridge case which is accomplished by holding one end 134 of the case with one head 136 which merely butts up against the end, and forcing a reducing die 138, mounted on the left hand spindle, over the other end 140 of the case 142. The case may then be stripped from the die by action of the internal rod 144 which is the same in form and function as the rod 395 of Fig. 20 of my aforesaid application for patent. The spindles do not rotate in this embodiment and the longitudinal movement may be controlled by the barrel cam through a follower block fixed to the spindles as in the embodiment of Fig. 5 of my concurrently filed application for patent Serial Number 723,691 for Mechanism for Working Tubular Members. It will be evident that the spindles on which the head 136 is mounted could readily be adapted to perform a forming operation on the other end of the case, however. This could be any of the types of operations described herein.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. A work holder for forming machines comprising a disk-shaped rotary plate having a socket in the periphery thereof adapted to receive elongated workpieces such that the ends thereof extend from opposite faces of said plate, a clamp member mounted in said plate for reciprocating movement at a tangent thereto, work-engaging surfaces on said socket and said clamp member, a toggle member pivoted in said plate, a toggle link having opposite ends pivoted respectively to said toggle member and said clamp member, and spring means for rotating said toggle member on its pivot whereby said toggle link reciprocates said clamp member into work clamping position in respect to said work-engaging surfaces of said toggle.

2. A work holder for forming machines comprising a disk-shaped rotary plate having a socket in the periphery thereof adapted to receive elongated workpieces such that the ends thereof extend from opposite faces of said plate, a clamp member mounted in said plate for reciprocating movement at a tangent thereto, work-engaging surfaces on said socket and said clamp member, a toggle member pivoted in said plate, a toggle link having opposite ends pivoted respectively to said toggle member and said clamp member, spring means for rotating said toggle member on its pivot whereby said toggle link reciprocates said clamp member into work clamping position in respect to said work-engaging surfaces of said toggle, and a surface on said toggle member projecting beyond the periphery of said plate adapted to engage an external cam member to rotate said toggle member on its pivot in opposition to said spring means.

3. A work holder for forming machines comprising a pair of coaxial spaced disk-shaped rotary plates having a socket in the periphery thereof adapted to receive elongated workpieces such that the ends thereof extend from opposite faces of said plates, a clamp supporting plate mounted between said disk-shaped plates, a clamp member mounted in said clamp supporting plate for reciprocating movement at a tangent to said disk-shaped plates, work-engaging surfaces on said clamp supporting plate and said clamp member, a toggle member pivoted on said clamp supporting plate, a toggle link having opposite ends pivoted respectively to said toggle member and said clamp member, and spring means for rotating said toggle member on its pivot whereby said toggle link reciprocates said clamp member into work clamping position in respect to said work-engaging surface of said clamp supporting plate.

4. A work holder for forming machines comprising a pair of spaced disk-shaped rotary plates having a socket in the periphery thereof adapted to receive elongated workpieces such that the ends thereof extend from opposite faces of said plates, a clamp supporting plate mounted between said disk-shaped plates, a clamp member mounted in said clamp supporting plate for reciprocating movement at a tangent to said disk-shaped plates, work-engaging surfaces on said clamp supporting plate and said clamp member, a toggle member pivoted on said clamp supporting plate, a toggle link having opposite ends pivoted respectively to said toggle member and said clamp member, spring means for rotating said toggle member on its pivot whereby said toggle link reciprocates said clamp member into work clamping position in respect to said work-engaging surface of said clamp supporting plate, and a surface on said toggle member projecting beyond the periphery of said plates adapted to engage an external cam member to rotate said toggle member on its pivot in opposition to said spring means.

5. A work clamp for forming machines comprising a clamp supporting plate, a socket in the periphery of said plate, a clamp member mounted in said clamp supporting plate for reciprocating movement toward and away from said socket, work-engaging surfaces on said socket and said clamp member, a toggle member pivoted on said clamp supporting plate, a toggle link having opposite ends pivoted respectively to said toggle member and said clamp member, and spring means for rotating said toggle member on its pivot whereby said toggle link reciprocates said clamp member into work clamping position in respect to said work-engaging surface of said clamp supporting plate.

References Cited in the file of this patent

UNITED STATES PATENTS

| | | |
|---|---|---|
| 666,905 | Packer | Jan. 29, 1901 |
| 766,403 | Uincke | Aug. 2, 1904 |
| 1,883,993 | Lee | Oct. 25, 1932 |
| 2,060,158 | Yager | Nov. 10, 1936 |
| 2,407,985 | Henke | Sept. 24, 1946 |
| 2,427,712 | Casler | Sept. 23, 1947 |
| 2,639,491 | Rose et al. | May 26, 1953 |